(12) United States Patent
Lukasik et al.

(10) Patent No.: US 9,350,945 B2
(45) Date of Patent: May 24, 2016

(54) SYSTEMS AND METHODS OF COMMUNICATING I/O DATA

(75) Inventors: Derek Lukasik, Ft. Collins, CO (US); Byron A Alcorn, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 13/990,205

(22) PCT Filed: Nov. 30, 2010

(86) PCT No.: PCT/US2010/058458
§ 371 (c)(1),
(2), (4) Date: May 29, 2013

(87) PCT Pub. No.: WO2012/074518
PCT Pub. Date: Jun. 7, 2012

(65) Prior Publication Data
US 2013/0242035 A1    Sep. 19, 2013

(51) Int. Cl.
*H04N 7/15* (2006.01)
*H04L 12/18* (2006.01)
*H04L 29/06* (2006.01)

(52) U.S. Cl.
CPC .............. *H04N 7/15* (2013.01); *H04L 12/1827* (2013.01); *H04L 65/1069* (2013.01); *H04L 65/403* (2013.01)

(58) Field of Classification Search
CPC combination set(s) only.
See application file for complete search history.

(56) References Cited

U.S. PATENT DOCUMENTS

| | | | |
|---|---|---|---|
| 4,710,917 A | 12/1987 | Tompkins et al. | |
| 6,377,282 B1 | 4/2002 | Champion | |
| 7,180,535 B2 | 2/2007 | Ahonen | |
| 7,451,181 B2 | 11/2008 | Sasaki et al. | |
| 7,516,179 B2 | 4/2009 | Huck et al. | |
| 7,549,127 B2 | 6/2009 | Chasen et al. | |
| 7,609,286 B2 | 10/2009 | Cupal et al. | |
| 7,774,430 B2 | 8/2010 | Hughes | |
| 8,432,896 B2* | 4/2013 | Foster et al. | 370/352 |
| 2001/0043571 A1* | 11/2001 | Jang et al. | 370/260 |
| 2007/0036143 A1* | 2/2007 | Alt et al. | 370/352 |
| 2008/0111880 A1* | 5/2008 | Lee | H04M 7/009 348/14.1 |
| 2009/0265487 A1 | 10/2009 | Zhang et al. | |
| 2010/0110978 A1* | 5/2010 | Falkena | H04M 7/0027 370/328 |
| 2010/0157013 A1* | 6/2010 | Sylvain | H04L 12/1827 348/14.01 |
| 2011/0221858 A1* | 9/2011 | Laiho | H04N 7/148 348/14.02 |

FOREIGN PATENT DOCUMENTS

| | | |
|---|---|---|
| EP | 0898424 A2 | 2/1999 |
| TW | I300199 B | 6/2007 |

OTHER PUBLICATIONS

International Search Report mailed Aug. 2, 2011, 8 pgs.
EP Search Report—Application No. 10860372.1-1905/2647196 dated Jul. 10, 2015—9 pages.

* cited by examiner

*Primary Examiner* — Joseph J Nguyen
(74) *Attorney, Agent, or Firm* — HP Inc Patent Department

(57) ABSTRACT

Video conferencing systems and methods are provided. A video conferencing system can include an audio/video (A/V) data path coupling a plurality of network devices. The system can further include at least one input/output (I/O) device providing I/O data coupled to at least one of the plurality of network devices. The I/O data is communicated along the A/V data path to each of the plurality of network devices.

19 Claims, 4 Drawing Sheets

SYSTEMS AND METHODS OF COMMUNICATING I/O DATA

BACKGROUND OF THE INVENTION

Description of the Related Art

Video conferencing technology provides geographically separated work groups the opportunity to meet and discuss shared projects. Some video conferencing products provide an "active desktop" or common work area where conference attendees may collaborate using a common file on the shared desktop, for example a graphical rendering or computer aided design (CAD) drawing. Such shared desktops greatly enhance the value and flexibility of video conferencing software. One of the challenges faced by conference attendees however is latency, the time lag between the time an attendee provides an input, for example a cursor movement, to the common work area and the time the results of the input are displayed. Such latency, when minimized makes precision work on the shared desktop difficult, and when not minimized, makes precision work on the shared desktop nearly impossible.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
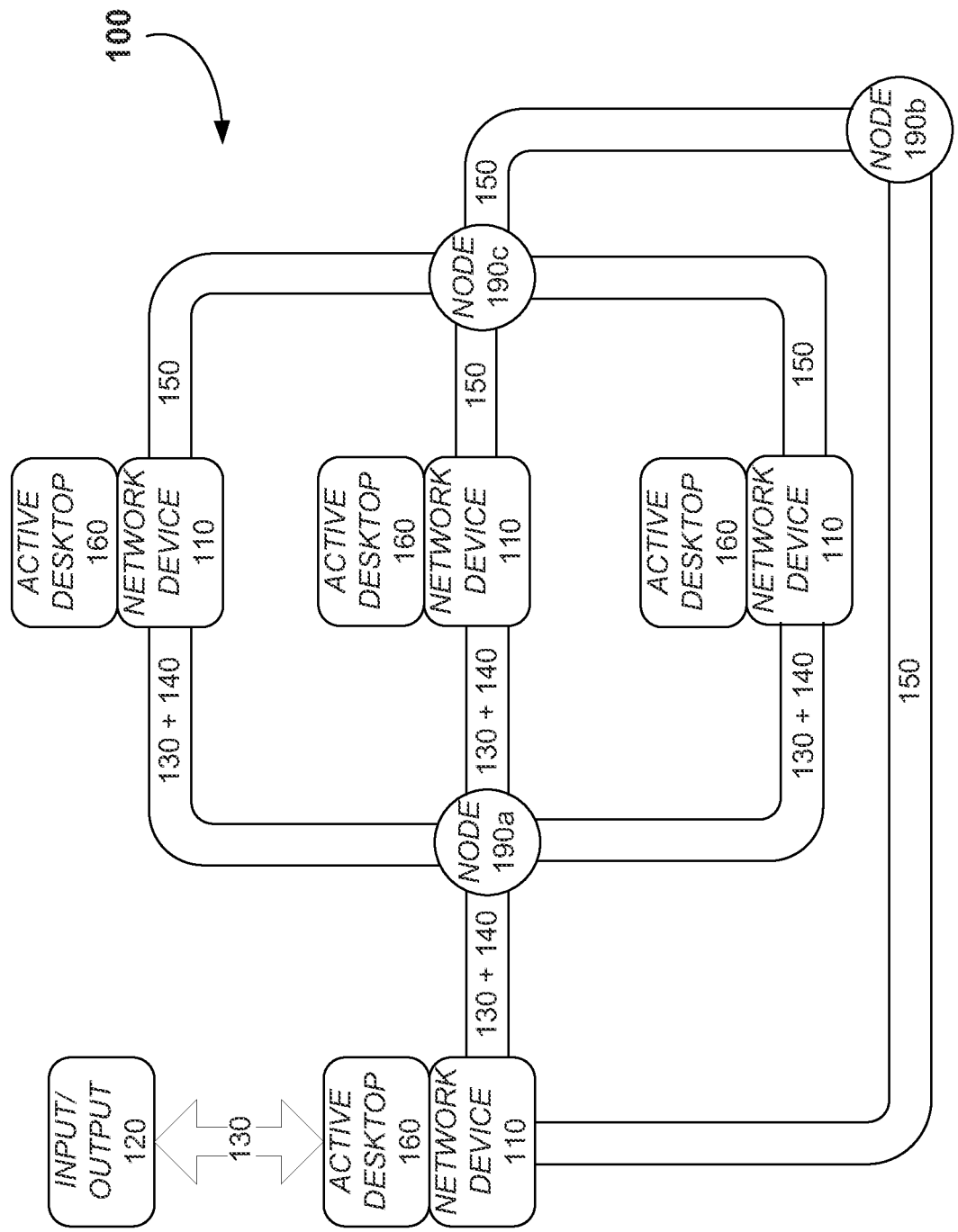
FIG. 1 is a schematic depicting an embodiment of an illustrative input/output (I/O) data communication system, according to one or more embodiments described herein.

Video conferencing technology plays an increasingly important role in business, providing a readily accessible method of collaboration between geographically separated parties. Typically, a conference initiator selects one or more conference attendees, a control data path is established between the conference initiator and some or all conference attendees. The control data path can be established using any of a variety of protocols dependent upon the network topology linking the conference participants.

Once a control data link is established between conference participants, an audio/video (A/V) data link can be established using an A/V data path. Since the A/V data link differs significantly from the control data link, for example requiring significantly greater bandwidth than the control data link, the A/V data path and the control data path are often not coincident, and in fact, often differ greatly based upon availability of network resources and loading at the time the A/V data path is established. The A/V data link can communicate A/V data generated by each of the conference participants, as well as an image of any collaborative workspace that is shared by all or a portion of the conference participants.

Should one or more conference participants elect to initiate a "shared workspace" with one or more other participants, the video data depicting the shared workspace will be transmitted along the A/V data path. However, when a conference attendee desires to provide input to the "shared workspace" the input (I/O) data signal must be similarly transmitted to all conference participants. Perceptible lag in the display of input information (for example the motion of a mouse across the shared workspace) is typically referred to as "latency." Significant latency issues can affect the overall quality of the conference experience for all conference participants.

An input/output (I/O) data communication system is provided. The system can include an audio/video (A/V) data path coupling a plurality of network devices. The system can further include at least one input/output (I/O) device providing I/O data coupled to at least one of the plurality of network devices. The I/O data is communicated along the A/V data path to each of the plurality of network devices.

As used herein, the term "couple" or "coupled" can refer to any form of direct, indirect, optical or wireless electrical connection. The electrical connection can, in one or more embodiments, include, but is not limited to any electrically conductive or magnetically inductive connection linking two or more devices. The connection can be electrically conductive, for example using one or more conductors such as copper or aluminum wire, conductive strips on a printed circuit board, or the like to connect two or more components. For example, the I/O device providing I/O data can have either a wired (e.g. Universal Serial Bus, PS2, etc.) or wireless (e.g. RF, Bluetooth, etc.) connection to the associated network device.

An input/output (I/O) data communication method is also provided. The method can include establishing an audio/video (A/V) data path among a plurality of network devices using a second protocol. The method can further include communicating A/V data between each of a plurality of network devices along the A/V data path. The method can include generating I/O data using at least one of the network devices and establishing an I/O data path between each of the plurality of network devices using the second protocol. The A/V data path and the I/O data path can share a common path between each of the plurality of network devices. The method can also include communicating the I/O data between the network devices along the coincident I/O and A/V data paths.

As used herein, the terms "communicate," "communication," and any process referred to as "communicating" can refer to one-way data transmission or receipt or two-way data transmission and receipt. The term can variously refer to, for example, analog or digital data transmission, analog or digital data receipt, or analog or digital data transmission and receiving. For example, as used herein, network devices referred to as "communicating" or as being "in communication" with other network devices can both transmit data to, and receive data from the remaining plurality of network devices.

Another input/output (I/O) data communication method is also provided. The method can include initiating a conference among a plurality of coupled network devices, where at least a portion of the plurality of network devices include an I/O device configured to provide I/O data. The method can also include establishing a control data path between each of the plurality of network devices using a first protocol. The method can further include establishing an audio/video (A/V) data path among the plurality of coupled network devices using a second protocol, where the first protocol differs from the second protocol and where the control data path and the A/V data path have a dissimilar network routing to each of the plurality of network devices. The method can also include generating I/O data using the I/O device coupled to at least one of the plurality of network devices and autonomously establishing an I/O data path among the plurality of coupled network devices using the second protocol, where the A/V data path and the I/O data path share a common network routing to each of the plurality of network devices.

FIG. 1 is a schematic depicting an embodiment of an illustrative input/output (I/O) data communication system 100, according to one or more embodiments. The system 100 can include a plurality of network devices 110, for example a plurality of interconnected network devices routed through a node 190*a*. At least one of the plurality of network devices 110 can include an I/O device 120 configured to provide I/O data 130 to the attached network device 110. In at least some embodiments, the I/O data 130 can be provided via an active desktop 160 or similar collaborative workspace disposed in, on, or about the network device 110 and shared among the plurality of network devices 110. An audio/video (A/V) data path 140, for example routed through node 190*a*, can interconnect or otherwise link the plurality of network devices 110. Control data, for example data used to initially establish the video conference, can be communicated among the plurality of networked devices 110 via a control data path 150, for example a control data path 150 routed through nodes 190*b* and 190*c*. In at least some embodiments, the control data path 150 can have a different routing than the A/V data path 140.

The system 100 can provide the capability to share video conference A/V data between each of plurality of network devices 110. The video conference can be initiated by communicating control data from the conference initiator at one of the plurality of network devices to the conference attendees at the remaining network devices 110. Since the control data has a relatively low bandwidth requirement, the control data path 150 can be routed using a first protocol, for example through nodes 190*b* and 190*c* as depicted in FIG. 1.

After the conference invitation is accepted by some or all of the plurality of network devices 110, A/V data can be communicated among the plurality of network devices 110 via the A/V data path 140. Since the A/V data consumes a significant portion of the overall bandwidth required by the video conference, the A/V data path can be routed using a second protocol accommodating the increased bandwidth required by the A/V data. In at least some embodiments, the second protocol can optimize the routing of the A/V data path among the plurality of network devices 110, for example by routing the A/V data path 140 through fewer intervening nodes 190 than the control data path 150.

The system 100 can also provide a common workspace, for example a active desktop 160 where each of the plurality of network devices 110 can provide collaborative input via one or more coupled I/O devices 120. In at least some embodiments, the I/O data path can be negotiated using the same (i.e. second) protocol used to negotiate the A/V data path 140. In at least some embodiments, the I/O data 130 can be transmitted in serial, in parallel, or in any combination thereof, with the A/V data along the A/V data path 140. Contemporaneous transmission of the I/O data 130 with the A/V data along a common or shared data path can improve the synchronization (i.e., reduce the latency experienced by the conference attendees) between the I/O device 120 input and the display of the input on the active desktop 160.

Each of the plurality of network devices 110 can include any number of systems, devices, or any combination of systems and devices configured to provide audio input, audio output, video input, video output, or combinations thereof. Each of the plurality of network devices 110 can include one or more audio input devices such as a microphone and one or more audio output devices such as a speaker. Each of the plurality of network devices 110 can include one or more video input devices such as a camera and one or more video output devices such as a Liquid Crystal Display (LCD) or Cathode Ray Tube (CRT) display device. Example network devices 110 can include, but are not limited to, desktop computing devices and portable computing devices.

An input/output (I/O) device 120 can be coupled to at least one of the plurality of network devices 110. The I/O device 120 can include any number of systems, devices or any combination of systems and devices suitable for providing input to, output from, or any combination input and output to or from the network device 110. Representative I/O devices 120 can include pointing devices such as mice or trackballs and alphanumeric data entry devices such as a keyboards or touchscreens. In at least one embodiment, the I/O device 120 can be coupled to the network device using wired or wireless technology such as via RF transceivers or Bluetooth®.

Video conferencing software can be executed by a processor disposed within each of the the plurality of network devices 110. The video conferencing software can cause the communication of control, audio, video, and I/O data among the plurality of network devices 110, for example a control data path 150 routed using a first protocol and an A/V data path 140 routed using a second protocol can be established among the plurality of network devices 110. After establishing one or more data paths, the video conferencing software can facilitate the communication of A/V data, such as video images and audio content via the A/V data path 140 between the plurality of network devices 110. As depicted in FIG. 1, the A/V data path 140 can be routed through one or more network nodes 190.

During the video conference, an active desktop 160 session can be initiated by one of the conference attendees. An active desktop 160 session can permit some or all of the conference attendees to collaborate on a single file. For example, one of the conference attendees can initiate an active desktop session 160 displaying a computer aided design ("CAD") file. The conference attendees can view and discuss the content of the CAD file displayed on the active desktop 160. Moreover, the active desktop 160 can provide each of the conference attendees with the ability to manipulate or change the content on the active desktop, for example by altering, adding, or deleting content displayed in the CAD file on the active desktop 160.

The input/output data 130 provided to the active desktop 160 can be routed via the control data path 150 or via another independent pathway, however the transit time of the I/O data between the plurality of network devices 110 may differ from the transit time of the A/V data between the plurality of network devices 110. Since the data displayed on the active desktop 160 is transmitted via the A/V data pathway 140, any difference in transit time between the I/O signal 130 and the A/V data transmitted via the A/V data pathway 140 will be experienced by all conference attendees as latency, where the displayed I/O input to the active desktop 160 lags the actual I/O input by a finite amount of time. Where the latency is very brief, the effect experienced by the conference attendees can be minimal, however where greater latency is encountered the effect experienced by the conference attendees can be significant, for example, where a conference attendee continues to provide repeated input commands to the active desktop due a perceived failure of the desktop to respond to the command (due to latency) only to find that ALL of the repeated commands are entered after the system latency period has expired.

The I/O data 130 can therefore be routed along, or coincident with, the A/V data path 140 by establishing the routing of the I/O data 130 using the second protocol used to establish the A/V data path 140. In such a manner, the I/O data 130 can be routed with the A/V data along the A/V data path 140. By routing the I/O data 130 along the A/V data path 140, the time lag (i.e., the latency) between the A/V signal displaying the active desktop 160 and the I/O data 130 carrying input to the active desktop is minimized, thereby enhancing the active desktop experience and usability for all conference attendees.

Using FIG. 1 as an illustrative example of the system described, the I/O data provided to the network device 110 can be routed to the remaining network devices 110 using a virtually infinite number of paths. One path may be the control data path 150, however the control data path 150, established using the first protocol extends through nodes 190b and 190c. The control data path 150 may therefore require a significantly greater transit time than the A/V data path 140 which is routed according to the second protocol through only one node 190a. Thus, routing I/O signals 130 using the first protocol (i.e., via the control data path 150) may lead to unacceptable levels of latency in the system 100. However, routing I/O signals 130 using the second protocol (i.e. via the A/V data path 140) can minimize the latency between the active desktop and the I/O data.

In at least some embodiments, the A/V data path 140 can transverse one or more firewalls established between two or more of the plurality of network devices 110. For example, some of the plurality of network devices 110 can be located on a first corporate local area network (LAN) protected by a first firewall, while the remaining plurality of network devices 110 can be located on a second corporate LAN protected by a second firewall. In such instances, the first and second firewalls may impede the ability to route I/O data 130 along the earlier established A/V data path 140. In at least some embodiments, a network firewall or network address translation device (NAT—a single internet protocol "IP" address behind which a plurality of network devices can reside) can be traversed using any available traversal technique. Representative traversal techniques include, but are not limited to, Session Traversal Utilities for Network Address Translators (STUN); Traversal Using Relay NAT (TURN); proxies such as ports 80 and 443; and similar traversal technologies.

The STUN protocol, for example, permits network devices 110 behind a NAT to learn the addresses allocated by the NAT to each of the network devices, to keep those bindings open, and communicate with other STUN-aware entities to validate connectivity and vitality. In essence, it is the STUN protocol that permits the plurality of network devices 110 to remain in contact with all other network devices 110 when those devices are disposed behind a security feature such as a firewall. As mentioned above STUN represents just one technique for providing communication between a disparate plurality of network devices 110, other techniques, such as those mentioned above, are applicable and of equal effectiveness.

Figure 2:
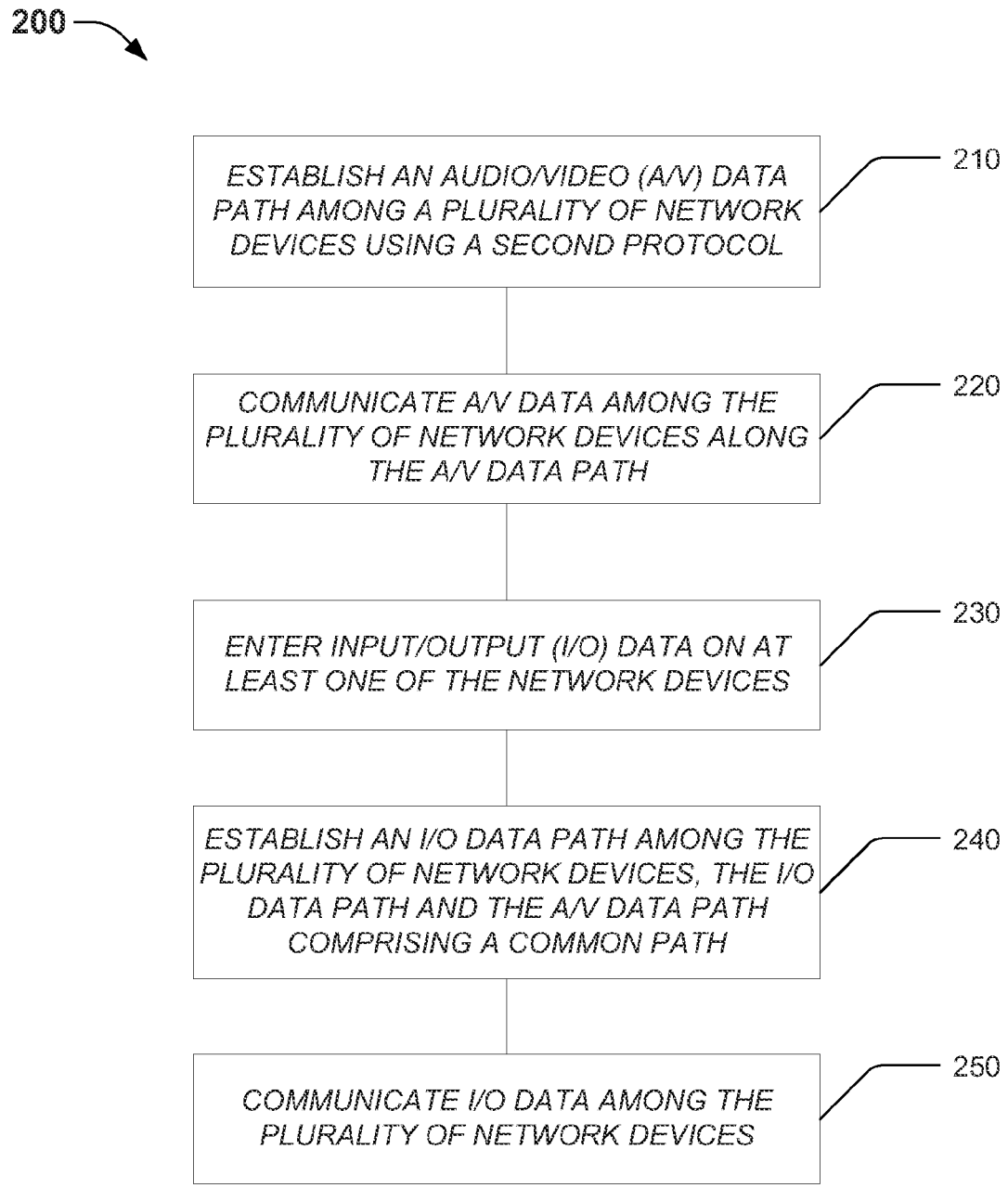
FIG. 2 is a flow diagram depicting an embodiment of an illustrative input/output (I/O) data communication method, according to one or more embodiments described herein.

FIG. 2 is a flow diagram depicting an embodiment of an illustrative input/output (I/O) data communication method 200, according to one or more embodiments. The data communication method 200 can be applied, for example, to a video conferencing system deployed across a plurality of network devices 110. An audio/video (A/V) data path 140 can be established between at least a portion of the plurality of network devices 110 at 210. In at least some embodiments, the A/V data path 140 can be established using a second protocol. In some embodiments, the A/V data path 140 can traverse one or more intervening firewalls or similar security features separating some or all of the plurality of network devices 110. In at least some embodiments, the A/V data path can be established using a second protocol, for example a Session Traversal Utilities for Network Address Translators (STUN) protocol.

After establishing an A/V data path 140 among the plurality of network devices 110, A/V data can be communicated between the linked plurality of network devices 110 at 220. The A/V data communicated among the linked plurality of network devices 110 can include, for example, audio data and video data generated by each of the plurality of network devices 110. In at least some embodiments, the A/V data can include one or more teleconference audio and video signals communicated among the plurality of network devices 110 via the A/V data path 140.

In at least some embodiments, at least a portion of the plurality of network devices 110 can include a coupled input/output ("I/O") device 120 capable of providing one or more I/O signals 130. The I/O device 120 can include one or more pointing devices and one or more data entry devices adapted to provide input to an active desktop or collaborative workspace 160 shared among the plurality of network devices 110. In at least some embodiments, a user at one of the plurality of network devices 110 can provide a pointing input signal 130 to the active desktop 160 using a mouse, trackball, touch screen, or similar input device.

I/O data 130 can be entered using an I/O device 120 coupled to at least one of the plurality of network devices 110 at 230. Representative I/O data 130 can include, but is not limited to, a pointer (e.g. mouse) input, alphanumeric data, or any combination thereof. In at least some embodiments, the I/O data 130 can be associated with data displayed on an active desktop or collaborative workspace 160 shared between the plurality of network devices 110.

The I/O data 130 entered using the I/O device 120 can be communicated to the remaining plurality of network devices 110. For example, the I/O data 130 entered into an active desktop 160 can be displayed on the active desktop portion 160 of each of the plurality of network devices 110. The I/O data path linking each of the plurality of network devices 110 can be established using the second protocol (i.e. the same protocol used to establish the A/V data path 140) at 240.

After establishing the routing of the I/O data 130 using the second protocol, the I/O data 130 can be communicated among the plurality of network devices 110 at 250. After establishing the I/O data path among the plurality of network devices 110, I/O data 130 entered on any of the plurality of network devices can be communicated with A/V data along the A/V data path 140. Use of the second protocol to route both the A/V data and the I/O data 130 can result in both data being routed along an identical path. Where the I/O data 130 is transmitted along the A/V data path 140, latency issues can be minimized since the A/V data path is generally used to display the contents of the active desktop 160 on each of the plurality of network devices 110.

Figure 3:
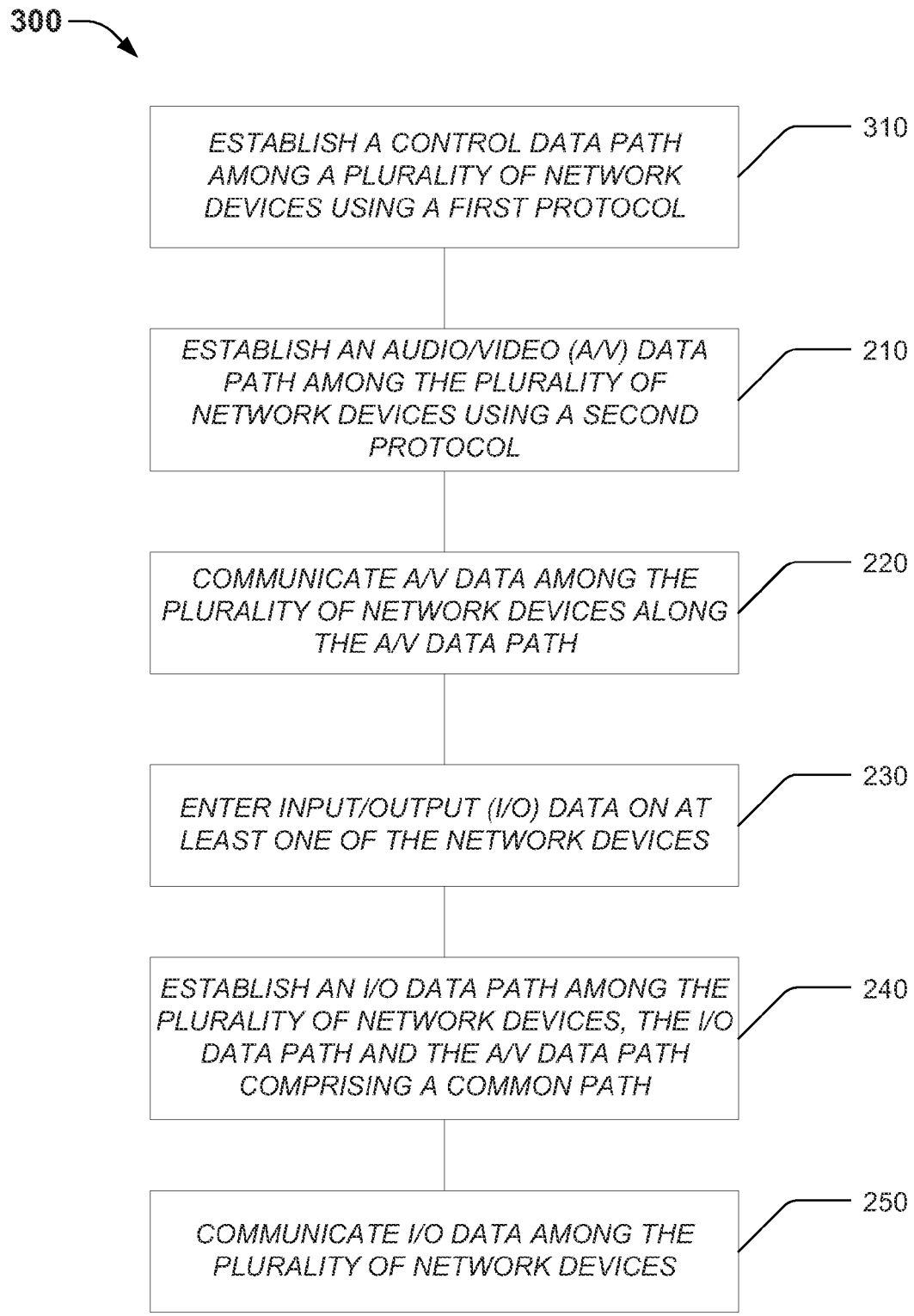
FIG. 3 is a flow diagram depicting another embodiment of an illustrative input/output (I/O) data communication method, according to one or more embodiments described herein.

FIG. 3 is a flow diagram depicting another embodiment of an illustrative input/output (I/O) data communication method 300, according to one or more embodiments. In at least some embodiments, a control data path 150 can be established among the plurality of network devices 110 prior to the establishment of the A/V data path 140. The control data path 150 can include, for example, a request to initiate a video conference, sent from the conference initiator to a plurality of network devices 110, each network device 110 at a location accessible to desired conference attendees. In addition to the conference notification and acceptance, control data can include one or more system performance parameters associated with each of the plurality of network devices 110.

The control data path 150 can be routed along a path linking the plurality of network devices using a first protocol at 310. Due to the relatively low bandwidth requirements of the control data communicated between each of the plurality of network devices 110, the routing of the control data path 150 can differ, sometimes significantly, from the routing of the relatively high bandwidth A/V signals along the A/V data path 140 established using the second protocol. In at least some embodiments, the difference in bandwidth allocated to using the first and second protocols can result in a transit time delay between the receipt of control data and the A/V data at each of the plurality of network devices 110. The transit time delay between the two signal paths can result in unacceptable latency being encountered when I/O signals 130 are transmitted along the control data path 150. Transmission of the I/O signals along the A/V data path 140 can reduce the latency encountered.

Figure 4:
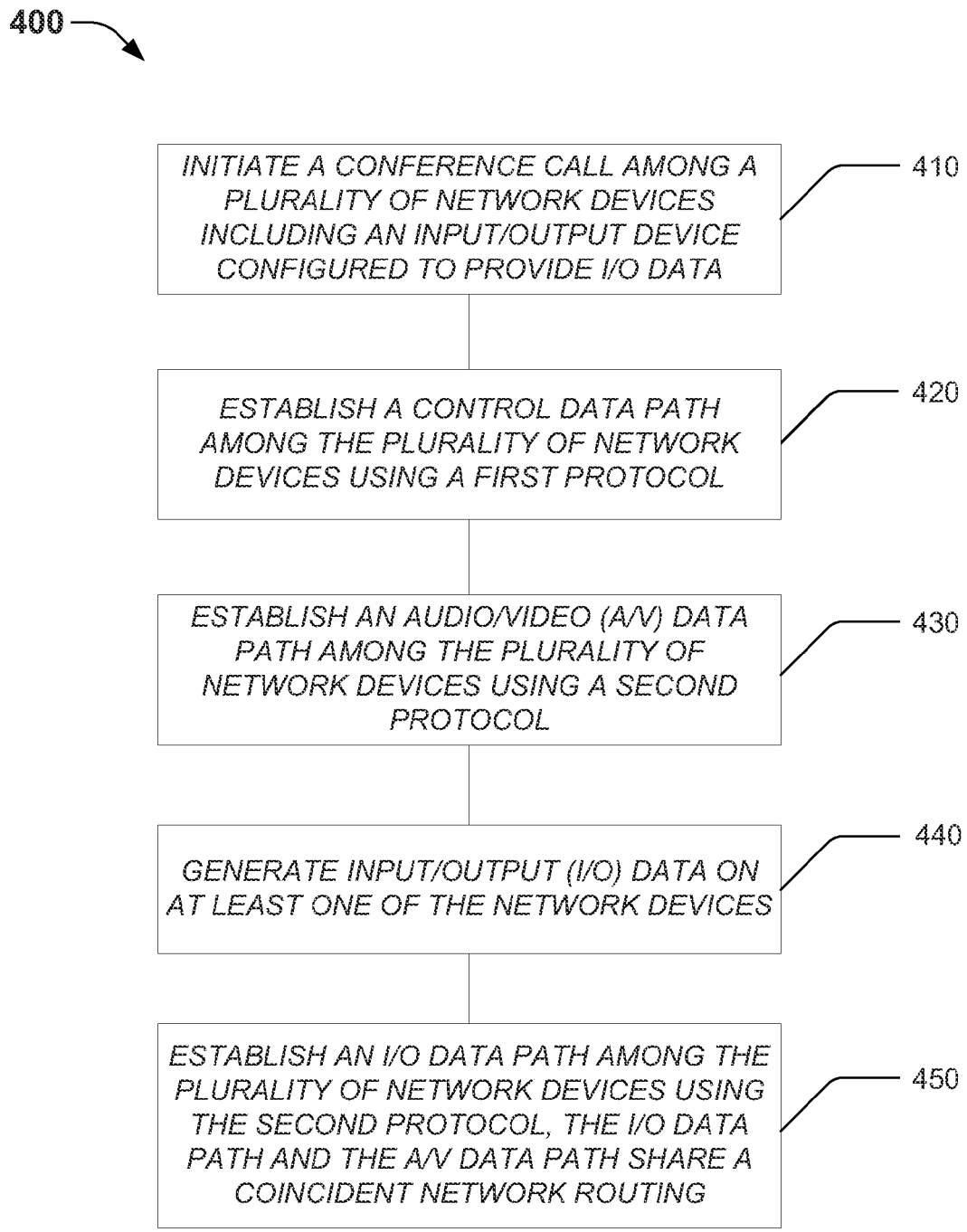
FIG. 4 is a flow diagram depicting yet another embodiment of an illustrative input/output (I/O) data communication method, according to one or more embodiments described herein.

FIG. 4 is a flow diagram depicting yet another embodiment of an illustrative input/output (I/O) data communication method 400, according to one or more embodiments. The method can include initiating a video conference among a plurality of network devices 110 at 410. The plurality of network devices 110 can include, but are not limited to, one or more desktop computing devices, one or more portable computing devices, one or more handheld computing devices, or any combination thereof. At least a portion of the plurality of network devices 110 can include an input/output (I/O) device 120. The 110 device 120 can be configured to provide 110 data 130, for example I/O data related to an active desktop 160 viewable on all or a portion of the plurality of network devices 110.

A control data path 150 can be established among the plurality of network devices 110 at 420. The control data path 150 can be routed using a first protocol adapted to one or more control signal parameters, for example the first protocol can route the control signal based upon the expected bandwidth requirement of the control signal. In at least some embodiments the control data path linking the plurality of network devices 110 can extend through a plurality of intervening devices, for example nodes 190b and 190c as depicted in FIG. 1.

The control data can include, inter alia, setup information regarding the video conference, the attendees, the plurality of network devices 110 and other data relevant to properly structuring or allocating the video conference resources and linking all of the attendees via their respective network devices 110.

Using the control data path 150 to identify conference attendees, an audio/video (A/V) data path 140 can be established among the plurality of network devices 110 at 430. The A/V data path 140 can provide a conduit for the communication of audio and video data among each of the plurality of network devices. The A/V data path 140 can be routed using a second protocol adapted to one or more control signal parameters, for example the second protocol can route the A/V signal based upon the expected bandwidth requirement of the A/V signal.

The conference can include an active desktop 160 on at least a portion of the plurality of network devices 110. The active desktop 160 can provide users on each of the plurality of network devices 110 the opportunity to work collectively on a single data file, for example a single CAD file, spreadsheet, or word processing document. When one or more users elect to begin a collaborative project within the shared workspace, I/O data related to the activity can be generated at 440.

The I/O data can then be shared between both the originator and all collaborators using the plurality of network devices 110.

The 110 data signal path can be established among the plurality of network devices 110 using the second protocol (i.e. the same protocol used to establish the A/V data path 140) at 450. By using the second protocol, the I/O data 130 can be transmitted along the A/V data path 140. Transmission of the I/O data 130 along the A/V data path 140 can minimize the latency experienced at each of the plurality of network devices 110 since the I/O data will be transmitted concurrently with the video data containing the image of the shared desktop 160.

While the foregoing is directed to embodiments of the present invention, other and further embodiments of the invention may be devised without departing from the basic scope thereof, and the scope thereof is determined by the claims that follow.

What is claimed is:

1. An input/output (I/O) data communication system, comprising:
   a control data path coupling a plurality of network devices to communicate control data among the plurality of network devices;
   an audio/video (A/V) data path coupling a plurality of network devices to communicate A/V data among the plurality of network devices; and
   an input/output (I/O) data path coupling the plurality of network devices to communicate I/O data among the plurality of network devices;
   wherein the control data path and the A/V data path include dissimilar data paths and use different protocols;
   wherein the A/V data path and the I/O data path include shared data paths and use the same protocol;
   wherein the control data occupies a first bandwidth and the A/V data occupies a second bandwidth greater than the first bandwidth.

2. The system of claim 1, wherein the A/V data path includes fewer intervening nodes than the control data path.

3. The system of claim 1, further comprising:
   at least one I/O device to provide the I/O data, the at least one I/O device coupled to at least one network device;
   wherein each of the plurality of network devices comprises an active desktop shared among the network devices; and
   wherein the I/O data can be provided to the active desktop using the at least one I/O device.

4. The system of claim 1, wherein the I/O data is routed coincident with the A/V data.

5. An input/output (I/O) data communication method, comprising:
   establishing a control data path among a plurality of network devices;
   establishing an audio/video (A/V) data path among the plurality of network devices;
   communicating control data among the plurality of network devices along the control data path and communicating A/V data among the plurality of network devices along the A/V data path, the control data path and the A/V data path comprising dissimilar data paths and using different protocols;
   generating input/output (I/O) data using at least one network device;
   establishing an I/O data path among the plurality of network devices, the I/O data path and the A/V data path comprising a common path and using the same protocol; and communicating I/O data among the plurality of network devices via the A/V data path;
wherein the control data occupies a first bandwidth and the A/V data occupies a second bandwidth greater than the first bandwidth.

6. The method of claim 5, a protocol of the A/V data path accommodating an increased bandwidth relative to a protocol of the control data path.

7. The method of claim 5, wherein the I/O data is routed coincident with the A/V data.

8. The method of claim 5, wherein the A/V data path traverses at least one intervening firewall.

9. The method of claim 5, wherein generating input/output (I/O) data using at least one network device comprises:
   initiating an active desktop session among the plurality of network devices; and
   entering I/O data into at the at least one network device using a coupled I/O device.

10. The method of claim 5, wherein the same protocol of the A/V data path and the I/O data path comprises a protocol configured to traverse an intervening firewall disposed between at least a portion of the plurality of network devices.

11. The method of claim 5, wherein the A/V data path and the I/O data path use a Session Traversal Utilities for Network Address Translators (STUN).

12. The method of claim 5, wherein the A/V data path includes fewer intervening nodes than the control data path.

13. An input/output (I/O) data communication method, comprising:
   initiating a conference among a plurality of network devices, wherein at least a portion of the plurality of network devices are coupled to an input/output I/O device to provide I/O data;
   establishing a control data path among the plurality of network devices to communicate control data of the conference among the plurality of network devices;
   establishing an audio/video (A/V) data path among the plurality of network devices to communicate A/V data of the conference among the plurality of network devices;
   wherein the control data path and the A/V data path include dissimilar data paths among the plurality of network devices and use different protocols;
   establishing an I/O data path between the plurality of network devices to communicate the I/O data among the plurality of network devices;
   wherein the A/V data path and the I/O data path include shared data paths among the plurality of network devices and use the same protocol;
   wherein the control data occupies a first bandwidth and the A/V data occupies a second bandwidth greater than the first bandwidth.

14. The method of claim 13, wherein the same protocol of the A/V data path and the I/O data path comprises a protocol configured to traverse at least one intervening firewall disposed between at least a portion of the plurality of network devices.

15. The method of claim 13, wherein the A/V data path and the I/O data path use a Session Traversal Utilities for Network Address Translators (STUN) protocol.

16. The method of claim 13, wherein the I/O data is routed coincident with the A/V data.

17. The method of claim 13, wherein the A/V data path includes fewer intervening nodes than the control data path.

18. The method of claim 13, further comprising:
   establishing the control data path prior to establishing the A/V data path.

19. The method of claim 13, wherein the control data includes at least one of a request to initiate the conference sent from an initiator of the conference to the plurality of network devices, a notification of the conference, an acceptance of the conference, and a system performance parameter associated with the plurality of network devices.

* * * * *